(12) United States Patent
Martinez Araiza et al.

(10) Patent No.: US 12,430,069 B2
(45) Date of Patent: Sep. 30, 2025

(54) SSD WITH MULTIPLE BANDWIDTH TIERS BASED ON PHYSICAL CHARACTERISTICS

(71) Applicant: Intel Corporation, Santa Clara, CA (US)

(72) Inventors: Jorge Ulises Martinez Araiza, Beaverton, OR (US); Michael Leslie Roy, Westminster, CO (US); Andrew Morning-Smith, Vancouver (CA)

(*) Notice: Subject to any disclaimer, the term of this patent is extended or adjusted under 35 U.S.C. 154(b) by 833 days.

(21) Appl. No.: 17/481,796

(22) Filed: Sep. 22, 2021

(65) Prior Publication Data

US 2022/0004342 A1    Jan. 6, 2022

(51) Int. Cl.
    *G06F 3/06*      (2006.01)

(52) U.S. Cl.
    CPC .......... *G06F 3/0659* (2013.01); *G06F 3/0604* (2013.01); *G06F 3/0613* (2013.01); *G06F 3/0635* (2013.01); *G06F 3/0679* (2013.01)

(58) Field of Classification Search
    CPC .... G06F 3/0659; G06F 3/0604; G06F 3/0613; G06F 3/0635; G06F 3/0679
    See application file for complete search history.

(56) References Cited

U.S. PATENT DOCUMENTS

| 2016/0041870 | A1* | 2/2016 | Davis | G06F 11/1048 714/773 |
| 2016/0170841 | A1* | 6/2016 | Yarnell | G06F 11/1469 714/19 |
| 2018/0165073 | A1* | 6/2018 | Gschwind | G06F 8/443 |
| 2019/0294553 | A1* | 9/2019 | Gavens | G06F 3/0679 |
| 2020/0004671 | A1* | 1/2020 | Neufeld | G11C 16/10 |

* cited by examiner

*Primary Examiner* — Prasith Thammavong

(74) *Attorney, Agent, or Firm* — Haley Guiliano LLP

(57) ABSTRACT

An embodiment of an electronic apparatus may include a substrate and a controller coupled to the substrate, the controller including circuitry to control access to a NAND-based storage media that includes a plurality of NAND devices located on the substrate and organized into two or more physical clusters with each NAND device uniquely assigned to one of the two or more physical clusters, perform data access to a first physical cluster of the two or more physical clusters at a first bandwidth, and perform data access to a second physical cluster of the two or more physical clusters at a second bandwidth that is slower than the first bandwidth. Other embodiments are disclosed and claimed.

14 Claims, 9 Drawing Sheets

SSD WITH MULTIPLE BANDWIDTH TIERS BASED ON PHYSICAL CHARACTERISTICS

BACKGROUND

A NAND device may have a specified number of levels of NAND memory cells. Such levels include a single level cell (SLC), a multi-level cell (MLC), a tri-level cell (TLC), a quad level cell (QLC), and so on. The different types of NAND media have different characteristics in terms of performance, capacity, endurance, cost, etc. In general, SLC may be higher performance, lower capacity, and higher endurance as compared to MLC, which be higher performance, lower capacity, and higher endurance as compared to TLC, and so on.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
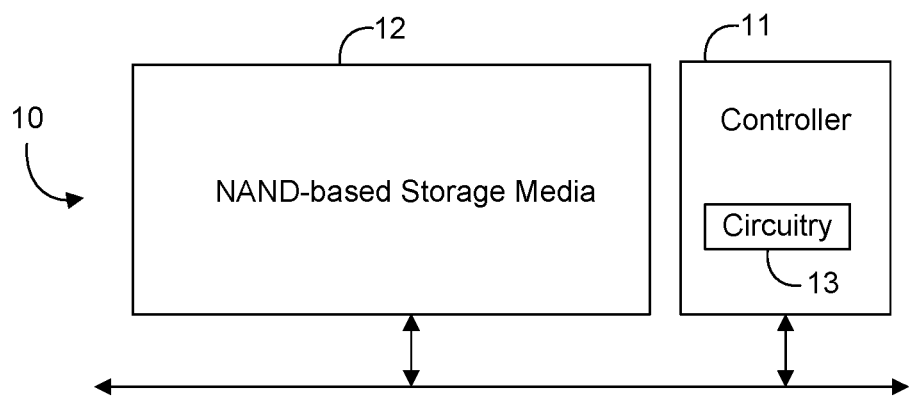
FIG. 1 is a block diagram of an example of an electronic storage system according to an embodiment.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smartphones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Various embodiments described herein may include a memory component and/or an interface to a memory component. Such memory components may include volatile and/or nonvolatile (NV) memory. Volatile memory may be a storage medium that requires power to maintain the state of data stored by the medium. Non-limiting examples of volatile memory may include various types of RAM, such as dynamic RAM (DRAM) or static RAM (SRAM). One particular type of DRAM that may be used in a memory module is synchronous dynamic RAM (SDRAM). NV memory (NVM) may be a storage medium that does not require power to maintain the state of data stored by the medium. In one embodiment, the memory device may include a block addressable memory device, such as those based on NAND technologies. In one embodiment, the memory device may be or may include memory devices that use multi-threshold level NAND flash memory, or other memory. The memory device may refer to the die itself and/or to a packaged memory product.

With reference to FIG. 1, an embodiment of an electronic storage system 10 may include NAND-based storage media 12 that includes a plurality of NAND devices located on a same substrate and organized into two or more physical clusters with each NAND device uniquely assigned to one of the two or more physical clusters, and a controller 11 communicatively coupled to the NAND-based storage media 12. For example, a NAND device may correspond to a single NAND die or integrated circuit (IC). The controller 11 may include circuitry 13 to perform data access to a first physical cluster of the two or more physical clusters at a first bandwidth, and perform data access to a second physical cluster of the two or more physical clusters at a second bandwidth that is slower than the first bandwidth. In some embodiments, the circuitry 13 may be further configured to perform data access to a third physical cluster at a third bandwidth that is slower than the second bandwidth (e.g., and a fourth physical cluster at a fourth bandwidth, and so on). The circuitry 13 may also be configured to control access to a first type of NAND media in the first physical cluster, and control access to a second type of NAND media in the second physical cluster (e.g., and a third type in the third physical cluster, and so on).

In some embodiments, the circuitry 13 may be configured to present each of the two or more physical clusters to a host as different drives. For example, the circuitry 13 may also be configured to direct an access request to a particular one of the two or more physical clusters based on a drive target of an input/output (IO) transaction, and/or to arbitrate multiple access requests to the two or more physical clusters to preserve a higher performance of physical clusters with faster bandwidth. In any of the embodiments herein, the controller 11 and the NAND-based storage media 12 may be incorporated in a solid-state drive (SSD).

For example, the substrate may be a printed circuit board (PCB) and the physical clusters of NAND devices may be grouped based on physical distances of the NAND devices from the controller 11 on the PCB and an achievable bus speed on the PCB to the NAND devices. In some embodiments, the circuitry 13 is configured to drive each cluster at a speed that is matched to the physical characteristics of the cluster (e.g., the intrinsic performance of the NAND devices assigned to the cluster, the location of the NAND devices assigned to the cluster relative to the controller 11, the channel length in the PCB from the controller to the NAND devices assigned to the cluster, etc.). In some embodiments, the physical clusters may be distributed across two or more substrates coupled together (e.g. two PCBs that are connected to each other over a cable or flexible PCB).

Embodiments of each of the above controller 11, NAND-based storage media 12, circuitry 13, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof. Embodiments of the controller 11 may include a general purpose controller, a special purpose controller, a memory controller, a storage controller, a micro-controller, a general purpose processor, a special purpose processor, a central processor unit (CPU), an execution unit, etc. In some embodiments, the NAND-based storage media 12, the circuitry 13, and/or other system memory may be located in, or located with, various components, including the controller 11 (e.g., on a same die).

Alternatively, or additionally, all or portions of these components may be implemented in one or more modules as a set of logic instructions stored in a machine- or computer-readable storage medium such as RAM, ROM, programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages. For example, the NAND-based storage media 12, other NAND-based storage media, or other system memory may store a set of instructions which when executed by the controller 11 cause the system 10 to implement one or more components, features, or aspects of the system 10 (e.g., the circuitry 13, performing data access to the first physical cluster at the first bandwidth, performing data access to the second physical cluster at the second bandwidth, etc.).

Figure 2:
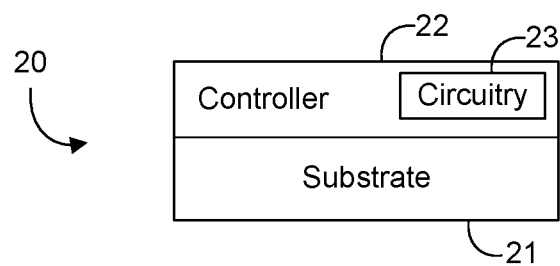
FIG. 2 is a block diagram of an example of an electronic apparatus according to an embodiment.

Turning now to FIG. 2, an embodiment of an electronic apparatus 20 may include a substrate 21, and a controller 22 coupled to the substrate 21. The controller 22 may include circuitry 23 to control access to a NAND-based storage media that includes a plurality of NAND devices located on the substrate 21 and organized into two or more physical clusters with each NAND device uniquely assigned to one of the two or more physical clusters, perform data access to a first physical cluster of the two or more physical clusters at a first bandwidth, and perform data access to a second physical cluster of the two or more physical clusters at a second bandwidth that is slower than the first bandwidth. In some embodiments, the circuitry 23 may be further configured to perform data access to a third physical cluster at a third bandwidth that is slower than the second bandwidth (e.g., and a fourth physical cluster at a fourth bandwidth, and so on). The circuitry 23 may also be configured to control access to a first type of NAND media in the first physical cluster, and control access to a second type of NAND media in the second physical cluster (e.g., and a third type in the third physical cluster, and so on).

In some embodiments, the circuitry 23 may be configured to present each of the two or more physical clusters to a host as different drives. For example, the circuitry 23 may also be configured to direct an access request to a particular one of the two or more physical clusters based on a drive target of an IO transaction, and/or to arbitrate multiple access requests to the two or more physical clusters to preserve a higher performance of physical clusters with faster bandwidth. In any of the embodiments herein, the controller 22 and the NAND-based storage media may be incorporated in a SSD.

Embodiments of the circuitry 23 may be implemented in a system, apparatus, computer, device, etc., for example, such as those described herein. More particularly, hardware implementations of the circuitry 23 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the circuitry 23 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the circuitry 23 may be implemented in a semiconductor which may be coupled to the substrate 21 (e.g., a circuit board substrate). In some embodiments, the circuitry 23 may be at least partly implemented in one or more of configurable logic and fixed-functionality hardware logic in a semiconductor apparatus (e.g., a silicon die, etc.). For example, the circuitry 23 may include a transistor array and/or other integrated circuit components in the semiconductor apparatus.

Figure 3:
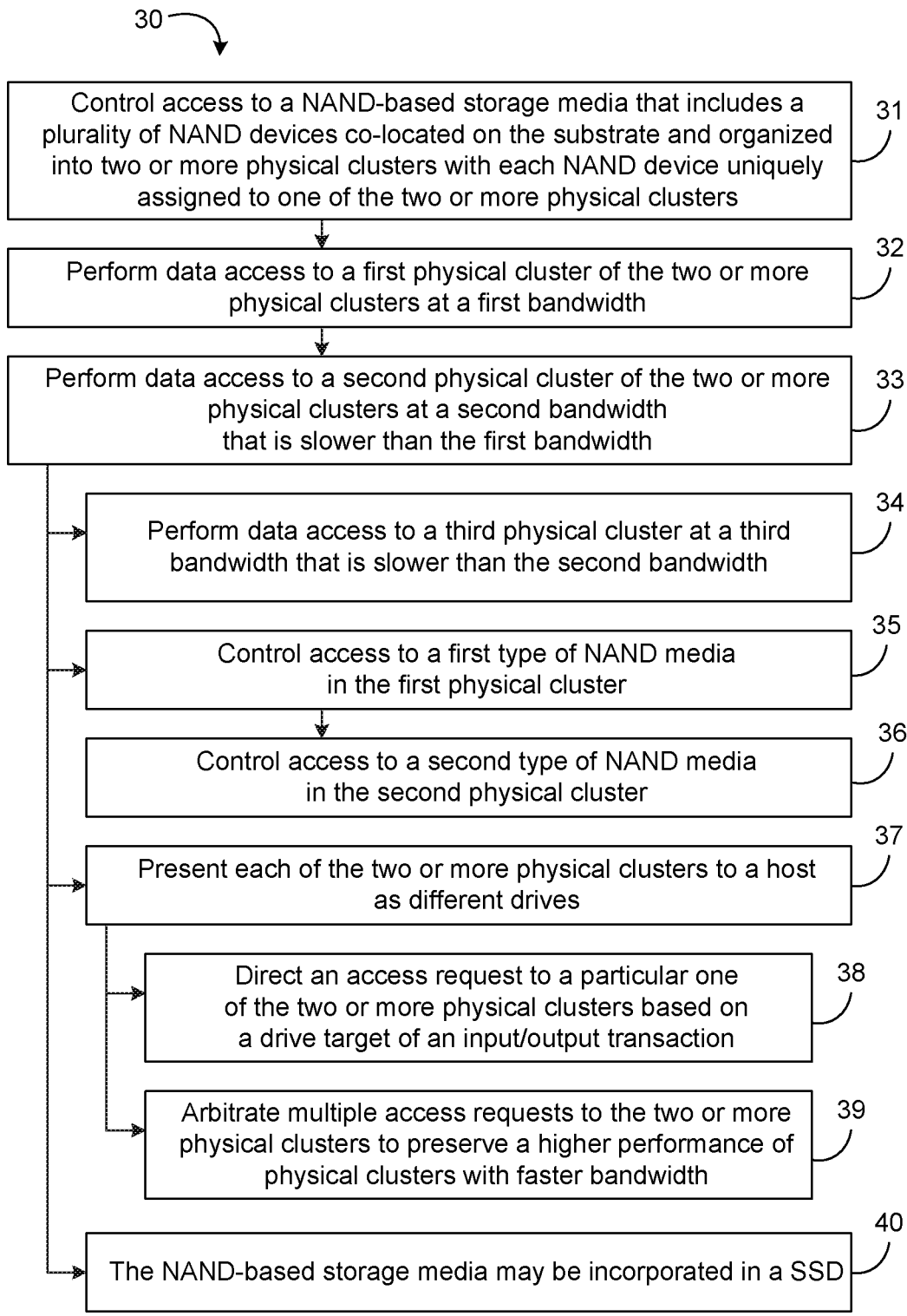
FIG. 3 is a flowchart of an example of a method of controlling storage according to an embodiment.

Turning now to FIG. 3, an embodiment of a method 30 of controlling storage may include controlling access to a NAND-based storage media that includes a plurality of NAND devices located on the substrate and organized into two or more physical clusters with each NAND device uniquely assigned to one of the two or more physical clusters at box 31, performing data access to a first physical cluster of the two or more physical clusters at a first bandwidth at box 32, and performing data access to a second physical cluster of the two or more physical clusters at a second bandwidth that is slower than the first bandwidth at box 33. Some embodiments of the method 30 may further include performing data access to a third physical cluster at a third bandwidth that is slower than the second bandwidth at box 34. The method 30 may also include controlling access to a first type of NAND media in the first physical cluster at box 35, and controlling access to a second type of NAND media in the second physical cluster at box 36.

Some embodiments of the method 30 may further include presenting each of the two or more physical clusters to a host as different drives at box 37. For example, the method 30 may also include directing an access request to a particular one of the two or more physical clusters based on a drive target of an input/output transaction at box 38, and/or arbitrating multiple access requests to the two or more physical clusters to preserve a higher performance of physical clusters with faster bandwidth at box 39. In any of the embodiments herein, the NAND-based storage media may be incorporated in a SSD at box 40.

Embodiments of the method 30 may be implemented in a system, apparatus, computer, device, etc., for example, such as those described herein. More particularly, hardware implementations of the method 30 may include configurable logic such as, for example, PLAs, FPGAs, CPLDs, Course-Grained Reconfigurable Fabric (CGRA), or in fixed-functionality logic hardware using circuit technology such as, for example, ASIC, CMOS, or TTL technology, or any combination thereof. Alternatively, or additionally, the method 30 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the method 30 may be implemented on a computer readable medium as described in connection with Examples 22 to 28 below. Embodiments or portions of the method 30 may be implemented in firmware, applications (e.g., through an application programming interface (API)), or driver software running on an operating system (OS). Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Some embodiments may advantageously provide technology for an on-demand performance and capacity SSD with physical location-optimized bandwidth for multi-tiered storage. A datacenter (DC) may rely on using several discrete storage solutions to deliver the performance/storage density the DC needs. Certain storage nodes in the DC may be focused on high performance (e.g., typically referred to as warm or hot storage) where high bandwidth and lowest latency are important. Other storages nodes in the DC may be focused on storage density (e.g., larger gigabytes (GB) per node) and typically allow for longer latencies and/or lower bandwidth. Each storage node may be populated with a number of discrete SSDs that are configured/optimized for a specific target function (e.g., performance or capacity).

Within each SSD, a physical distance between the SSD controller and the NAND devices dictates how fast/slow the parallel NAND interface can operate (e.g., an Open NAND flash interface (ONFI)). A problem is that the performance of a conventional SSD is limited by the slowest speed in the chain, which may correspond to the NAND device with the longest physical channel to the controller. A conventional single, discrete SSD device is configured/optimized for a single purpose (e.g., latency or density). Accordingly, a DC may need duplication of storage nodes and/or need to have more storage nodes per function, with higher power, cost, space, etc. demands due to duplication. Some embodiments overcome one or more problems with conventional SSDs. Some embodiments may provide a single, discrete SSD that may be configured/optimized for multiple purposes (e.g., both latency and density). Some embodiments may provide technology that enables higher performance to be utilized for those NAND devices closer to the controller.

Some embodiments may leverage a physical layout of the SSD, with some NAND devices being close to the controller and some being further from the controller. Some embodiments may tune or optimize the bus speed (e.g., bandwidth) into physical clusters, advantageously resulting in overall higher bandwidth to the controller. In some embodiments, each type of NAND media and the physical location of the NAND devices in the drive may be selected to deliver suitable performance for a variety of applications. For example, some embodiments may utilize higher performance media (e.g. TLC) for channels that are physically closer to the controller and may utilize high-density storage media (e.g. penta-level cell (PLC) NAND media with five bits per NAND memory cell) for channels located further away from the controller.

In some embodiments, physical clusters may be exposed to the host and host may decide what data goes on a relatively faster physical cluster versus a relatively slower physical cluster. In some embodiments, physical clusters may be managed within the drive and the drive may decide/manage what data goes on a relatively faster physical cluster versus a relatively slower physical cluster. For example, the host may place high priority or more frequently accessed data in the physical clusters with faster bandwidth, and/or the drive may arbitrate multiple access requests to the physical clusters to preserve the higher performance of physical clusters with faster bandwidth.

In some embodiments, a SSD is configured with multiple physical clusters of NAND devices grouped based on distance from the controller (e.g., and achievable bus speed), and a controller that is configured to drive each cluster at a speed that is matched to the physical characteristics of the cluster (e.g., based on the intrinsic performance of the NAND devices, the location of the NAND media, the channel length, etc.). In some embodiments, NAND components with varying degrees of performance as measured by the NAND technology each component supports (TLC/QLC/PLC) may be assigned to the clusters (e.g., all TLC NAND is one cluster, all QLC NAND is another cluster, etc.). In some embodiments, the use of different performance clusters may be handled internally within the drive (e.g., by the controller). In some embodiments, the use of different performance clusters may be handled by the host by presenting each pool of NAND as a separate virtual drive and handling it accordingly.

Figure 4:
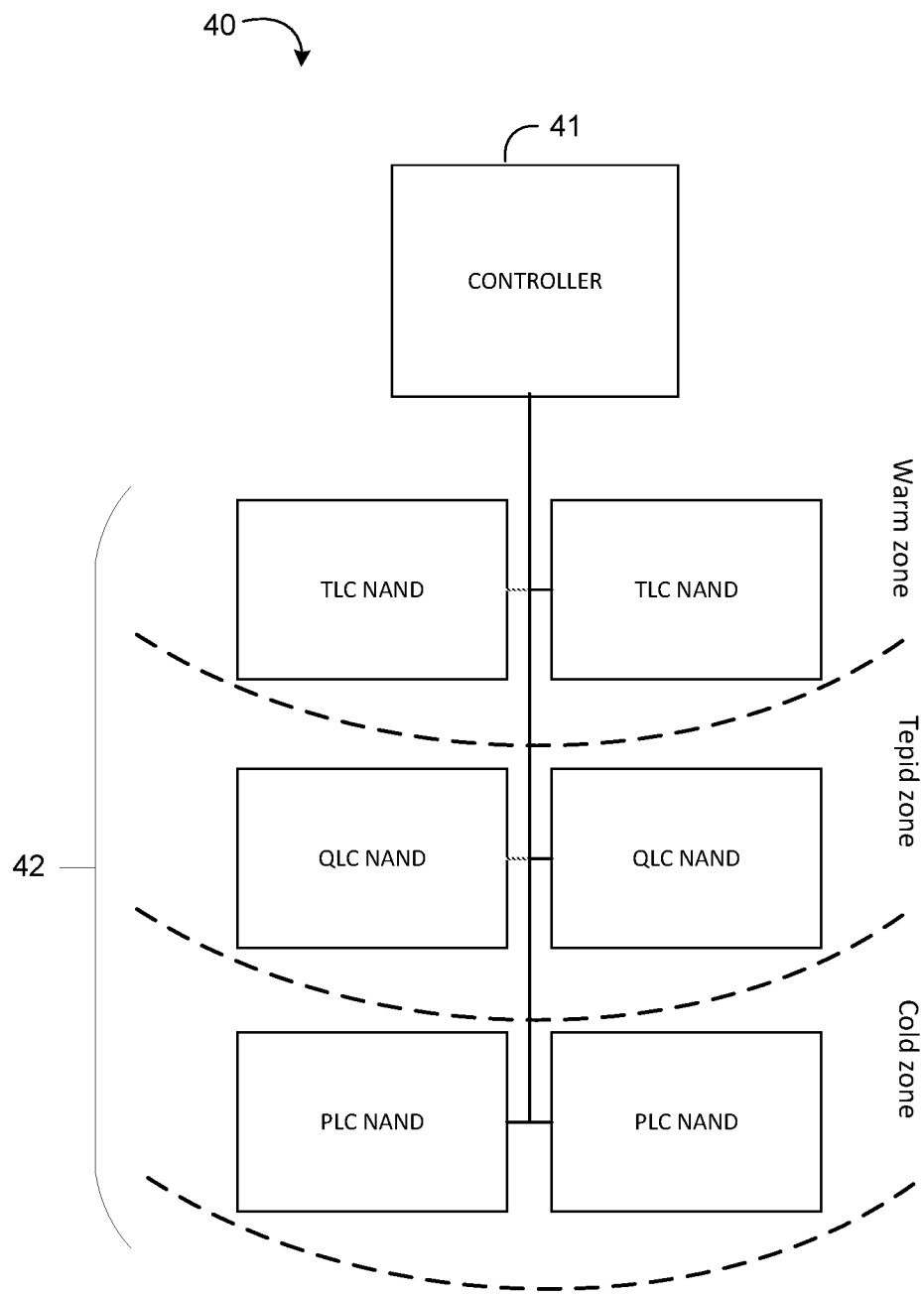
FIG. 4 is a block diagram of an example of a solid-state drive (SSD) according to an embodiment.

With reference to FIG. 4, an embodiment of a SSD 40 includes a controller 41 and NAND-based storage media 42 that includes a plurality of NAND devices organized into three zones (e.g., a warm zone, a tepid zone, and a cold zone). In physical implementation of the SSD 40, each of the zones corresponds to a physical cluster of NAND devices with each NAND device uniquely assigned to one of the physical clusters. For example, the warm zone may include a physical cluster of TLC NAND devices, the tepid zone may include QLC NAND devices, and the cold zone may include PLC NAND devices. The respective zones may further correspond to respective performance tiers. For the SSD 40, for example, an increase in physical distance from the controller 41 corresponds with an increase in the channel length (e.g., slower bus speeds) and a decrease in the bandwidth performance of the NAND devices (e.g., slow device speeds) in each subsequent zone.

Figure 5A:
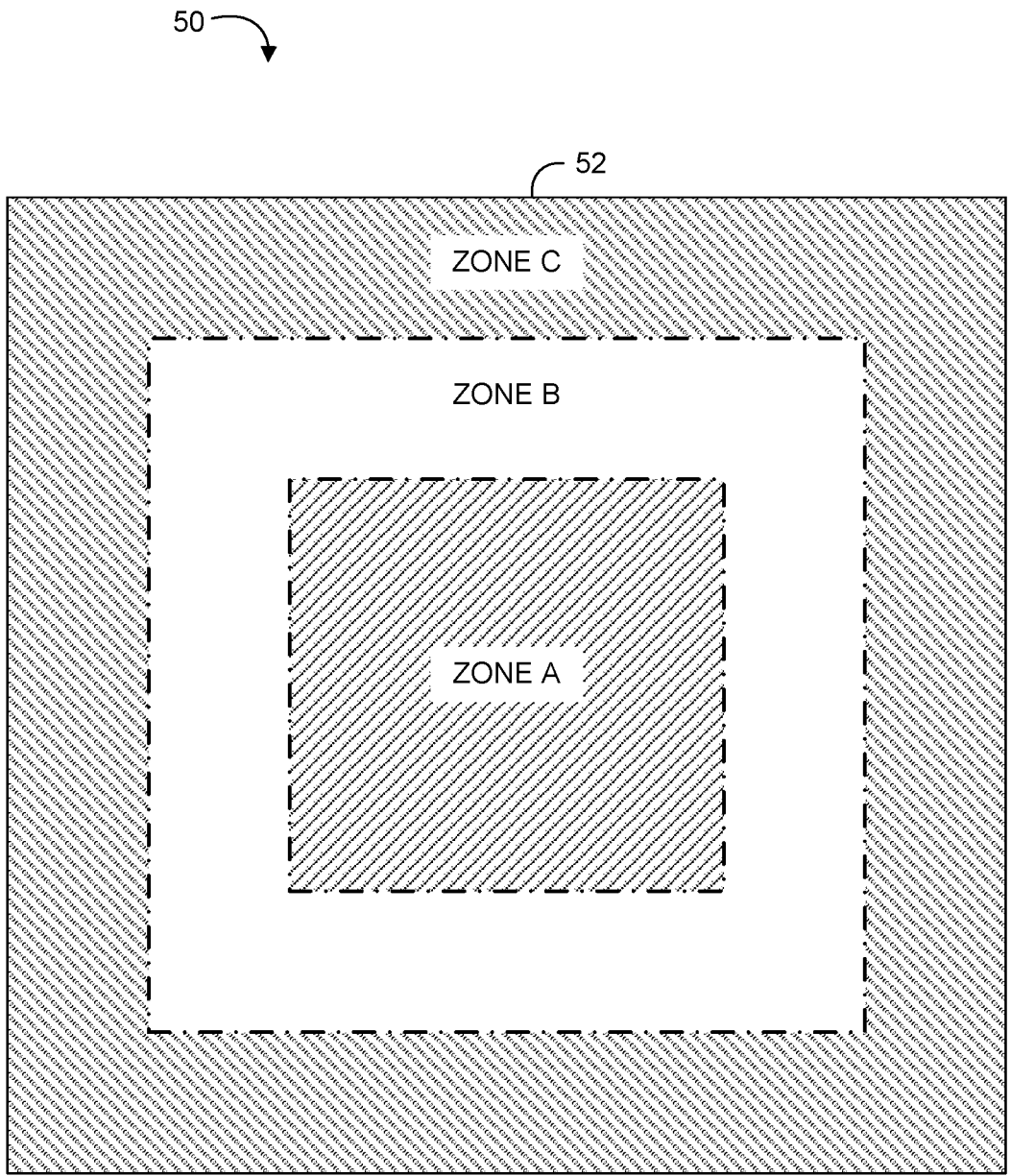
FIGS. 5A to 5B are block diagrams of another example of a SSD according to an embodiment.
Figure 5B:
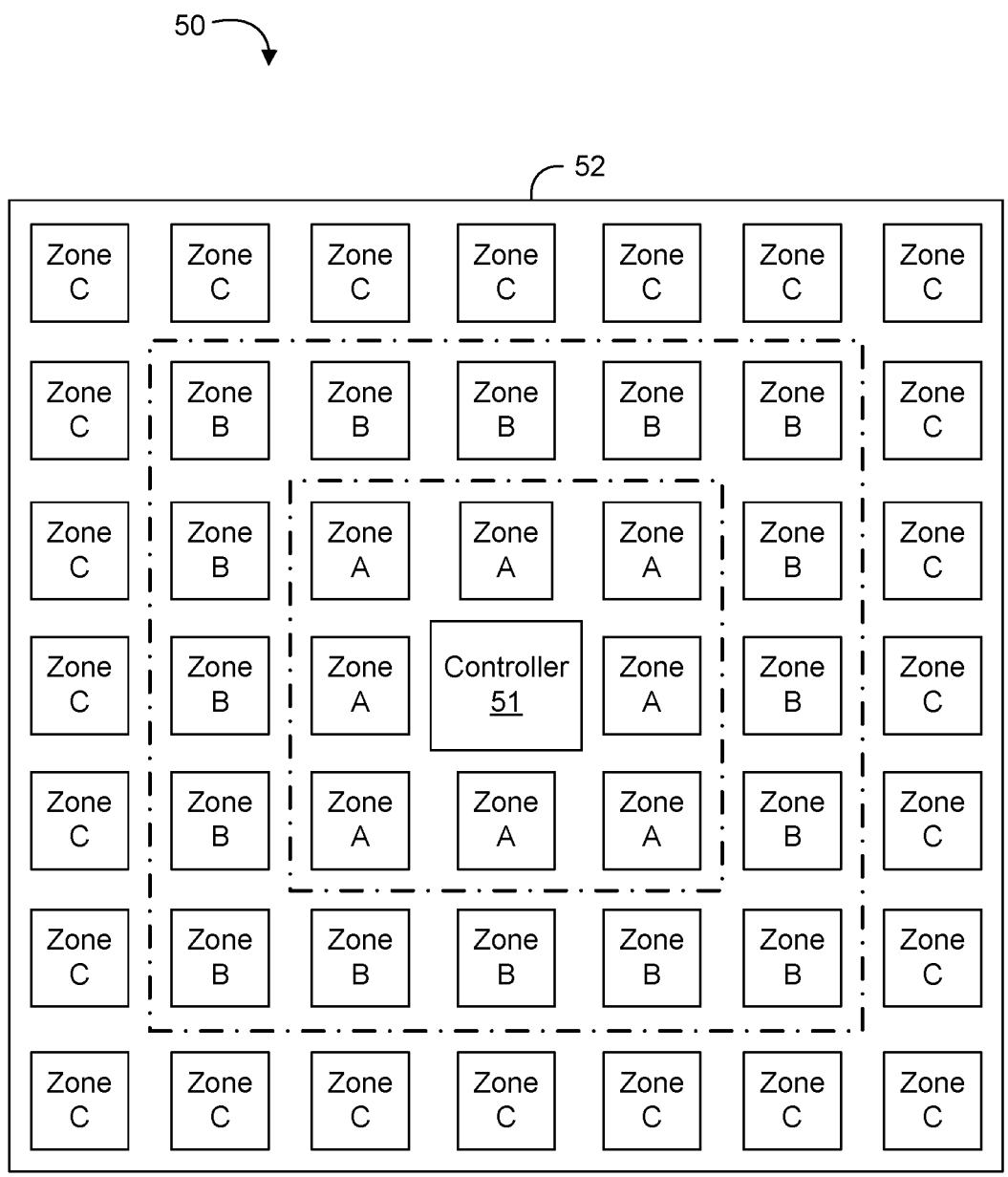

In physical implementations, the zones may have any useful arrangement, and are not necessarily regular in shape. FIGS. 5A to 5B show an embodiment of a SSD 50 that includes a controller 51 and a plurality of NAND devices organized into three zones A, B, and C on a PCB 52. The controller 51 is centrally located on the PCB 52 and the three zones A, B, and C are substantially concentric rectangles around the controller 51. Each NAND device is illustrated with the zone assigned to that device. For example, as the NAND devices get further away from the controller 51, their respective physical channel lengths may increase such that data access from the further devices must be performed at slower channel speeds. FIGS. 5A and 5B show only one side of the PCB 52. Zones A, B, and C (e.g. or other zones) may also be provided on the other side of the PCB 52, and may match or be different from the illustrated zones.

Figure 6A:
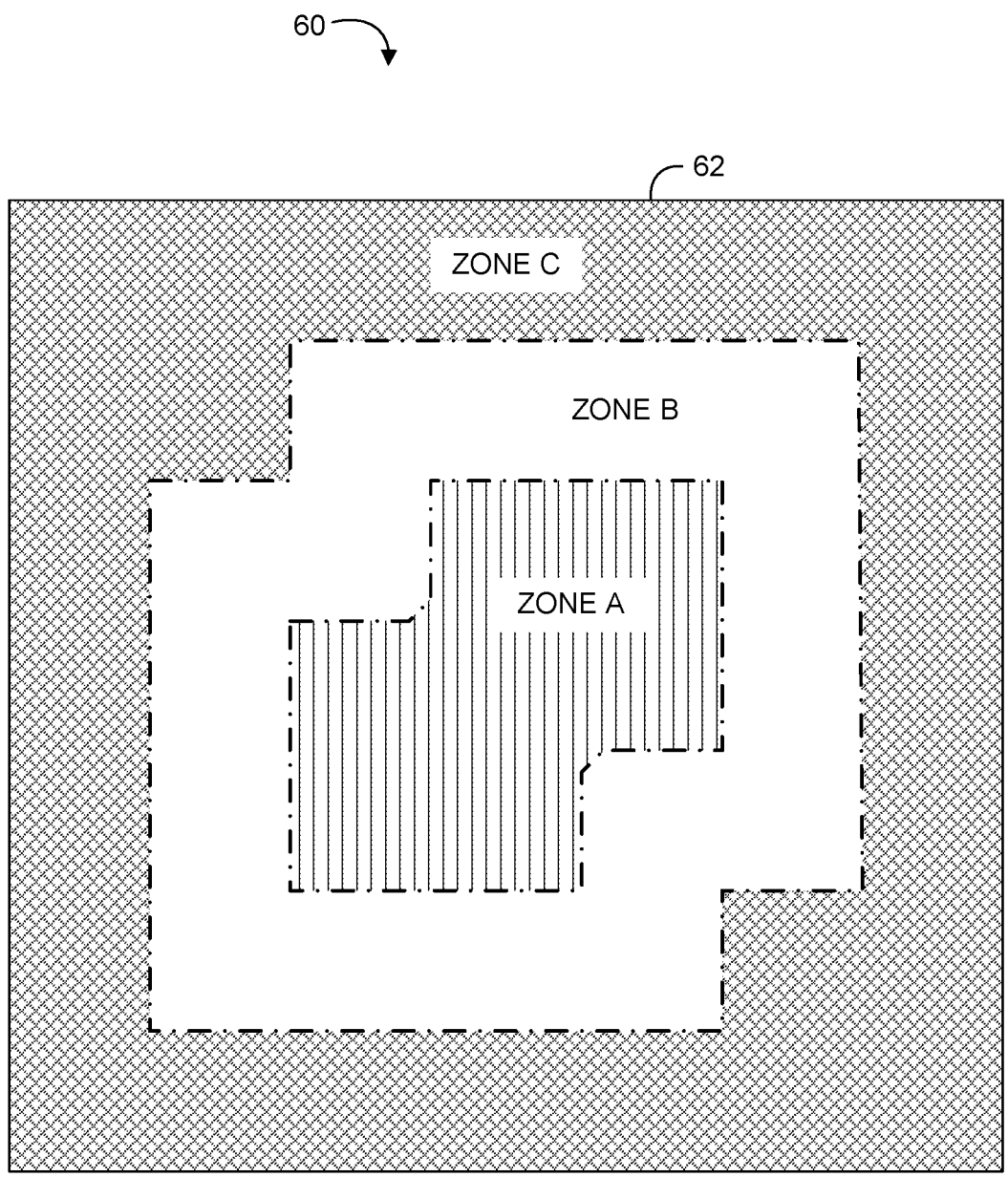
FIGS. 6A to 6B are block diagrams of another example of a SSD according to an embodiment.
Figure 6B:
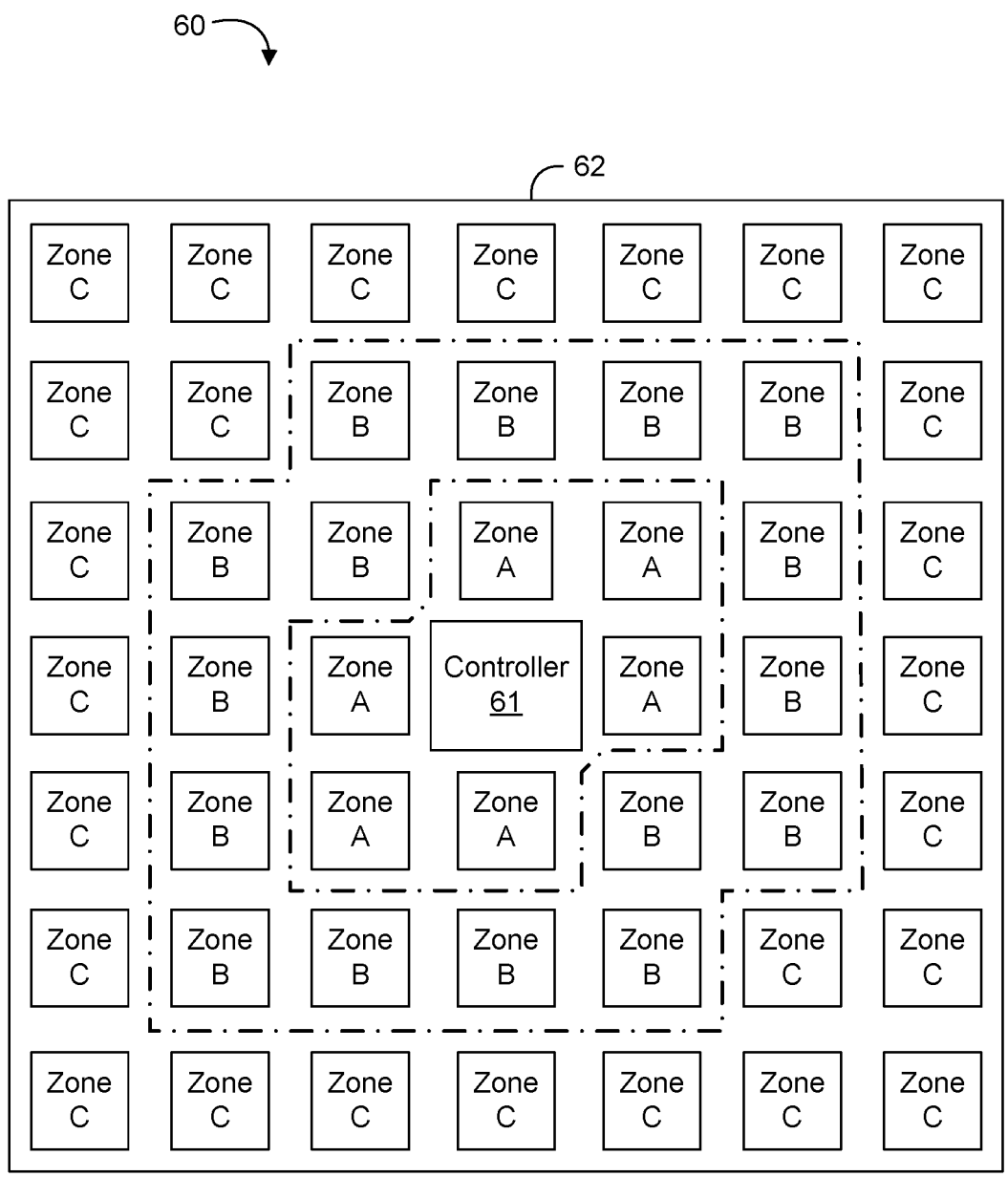

With reference to FIGS. 6A to 6B, an embodiment of a SSD 60 includes a controller 61 and a plurality of NAND devices organized into three zones A, B, and C on a PCB 62. The controller 61 is centrally located on the PCB 62, but the three zones A, B, and C are irregularly shaped around the controller 61. Each NAND device is illustrated with the zone assigned to that device. Even though some of the NAND devices are the same physical distance from the controller 61, they might be assigned to different zones because of other physical characteristics of the PCB 62 (e.g., internal signal routing, internal capacitance, etc.) or other considerations (e.g., a desired amount of storage capacity for each zone, cost of devices, size of devices, etc.). FIGS. 6A and 6B show only one side of the PCB 62. Zones A, B, and C (e.g. or other zones) may also be provided on the other side of the PCB 62, and may match or be different from the illustrated zones.

In some embodiments, all of the NAND devices may be the same type of media (e.g., Zone A devices are TLC, Zone B devices are TLC, and Zone C devices are TLC). The physical cluster of NAND devices in Zone A may be able to operate at full speed (e.g., because of the short channel length), but the physical cluster of NAND devices in Zone B must be operated at slower speeds because of the medium channel length, and the physical cluster of NAND devices in Zone C must be operated even slower than the devices in Zone B because of the long channel length.

In some embodiments, each of the NAND devices in a particular zone may be the same type of media, but different media types may be assigned to different zones. For example, Zone A devices may be TLC, Zone B may be QLC, and Zone C may be PLC. With this configuration, the speed of the NAND devices may be better matched to the channel speed. Even though the channel speed of Zone C may be slower than Zone B, and Zone B may be slower than Zone A, each of the zones may support the full speed of the NAND devices assigned thereto.

Advantageously, some embodiments provide higher performance by having each cluster run at the maximum speed the cluster is capable of rather than running all clusters at the speed of the worst case channel. In embodiments where multiple performance clusters are exposed to the host, a DC rack has the flexibility of multiple storage tiers in a more simplified and unified configuration, advantageously reducing the need for dedicated racks for high performance and high density, and potentially further advantageously reducing power demands, improving total cost of ownership (TCO), etc. In some embodiments, SSD firmware may be configured to stage/de-stage data between lower performance and higher performance tiers at the direction of the host controller, advantageously eliminating extra network bandwidth with the host for such staging.

In some embodiments, an embodiment of a single SSD with multiple storage tiers (e.g., implemented on a suitably formatted printed circuit board (PCB) may be plugged into an available slot in a DC rack and the SSD shows as multiple discrete drives in the OS and/or target application (e.g. one physical drive reports more than one logical device, and the devices may report different drive properties: endurance, latency, performance, etc.) Performance of each reported drive (e.g., as measured by a SW based performance tool such as IOmeter to measure data throughputs) may drastically change based on the data being transmitted and/or stored to each of those discrete virtual drives. In some embodiments, the physical buses for each NAND device may show different clock speeds for each of the different NAND clusters (e.g., corresponding to different transfer throughputs within the same SSD).

As noted above, physical distance between the SSD controller and a NAND device may dictate how fast/slow a parallel ONFI NAND interface can operate. For a conventional SSD with uniform NAND devices, the performance of the SSD is limited by the slowest speed in the chain, likely corresponding to the device with the longest physical channel to the controller. Assuming equal die loading, for example, channel lengths of about 80 mm or less (e.g., nominally a short channel) may generally support higher speeds (e.g., a speed specification of about 1600 megatransfers per second (MT/s)), as compared to channel lengths of about 81 mm to 160 mm (e.g., nominally medium channels; typically 1-2 bins down with speed specifications of about 1200 MT/s to 1433 MT/s depending on channel loading). Similarly, medium channels may generally support higher speeds as compared to channel lengths of greater than 160 mm (e.g., nominally long channels; typically 2-3 bins down with speed specifications of about 1033 MT/s to 1200 MT/s).

Another physical factor that limits performance is the type of NAND being used. TLC media is faster than QLC and QLC is faster than PLC. For two otherwise identical drives, a pure TLC drive has a significant lower latency and higher endurance than a PLC drive, for example.

Some embodiments may consider the foregoing and other limiting factors and optimize such factors individually by accounting for both the physical aspects of the drive itself (e.g., how far or close certain NAND packages are relative to the controller) as well as what type of performance is expected and required for the specific type of NAND media in question (e.g., TLC/QLC/PLC/etc.). In some embodiments, an improved or optimized arrangement may involve placing the NAND media that requires highest bandwidth in the locations closest to the controller, and placing the media that is better suited for higher density (e.g., less performance critical) on the longest channels of the SSD (e.g., locations further from the controller).

Figure 7:
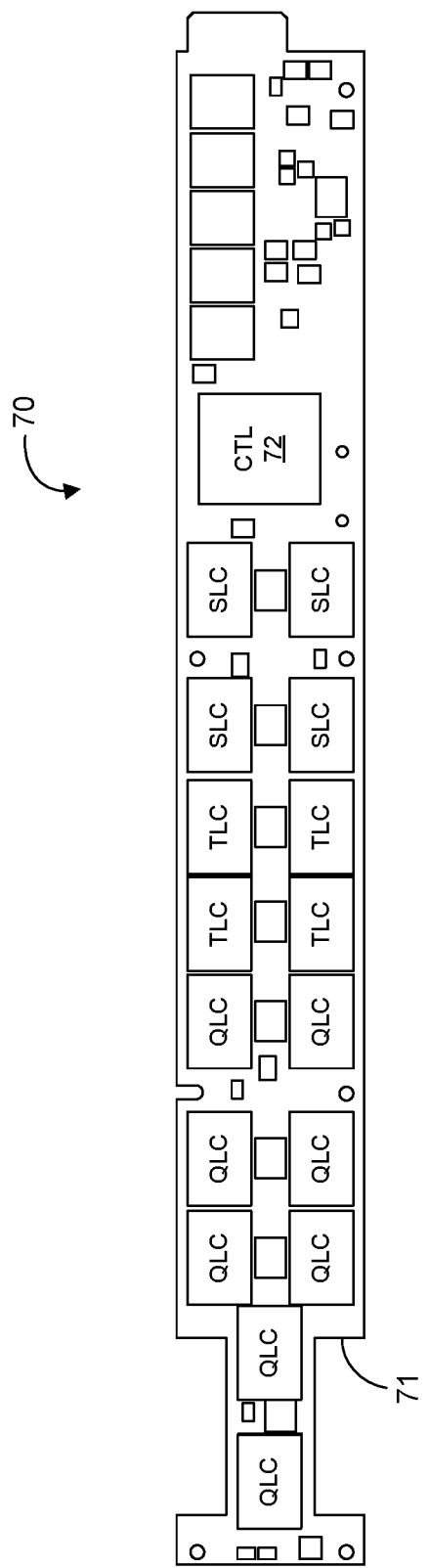
FIG. 7 is an illustrative top view of another example of a SSD according to an embodiment.

With reference to FIG. 7, an embodiment of a SSD 70 includes a PCB 71 with an E1.L standard form factor. The SSD 70 may be configured for performance clustered, bandwidth-optimized storage. FIG. 7 shows only one side of the SSD 70, with 16 packages of NAND ICs per side for a total of 32 NAND devices. The eight devices closest to the controller 72 are populated with faster SLC NAND media, while the more remote devices are populated with high density QLC media. In operation, performance of the SSD 70 may be directly tied to the channel speed. The below performance data is a non-limiting example for illustration purposes only. Other example may further configure the channels to reach faster speeds by use of other techniques.

For the illustrated example SSD 70 with 8 first tier performance sites populated with SLC NAND devices, 8 second tier performance sites populated with TLC NAND devices, and 16 third tier performance sites populated with QLC NAND devices, an example configuration for an embodiment of controller based on bus/device/other physical characteristics of the PCB 71 may be as listed in Table 1.

TABLE 1

| Tier | Media | Bus speed |
|---|---|---|
| 1 | SLC | 1600 MT/s |
| 2 | TLC | 1433 MT/s |
| 3 | QLC | 1200 MT/s |

In an example operation of the SSD 70, the controller 72 may get assigned up to 3 storage pools, each corresponding to one performance tier. The SSD 70 has enough local DRAM to handle temporary data caching for each virtual SSD. Based on FW and driver interaction, the SSD 70 presents itself to a host as a collection of virtual drives (e.g., anywhere between 2-3 virtual drives depending on the target use and application). Based on the drive target of the IO transaction (e.g. a request is made to store critical data in the SLC pool), the controller 72 writes/reads the data request from that specific tier. The controller 72 may also be configured to implement arbitration techniques to handle multiple consecutive requests between different storage pools. For example, requests to access data in the highest priority pool may need to be acted upon first, with lower priority to those requests for long term high density storage.

Figure 8A:
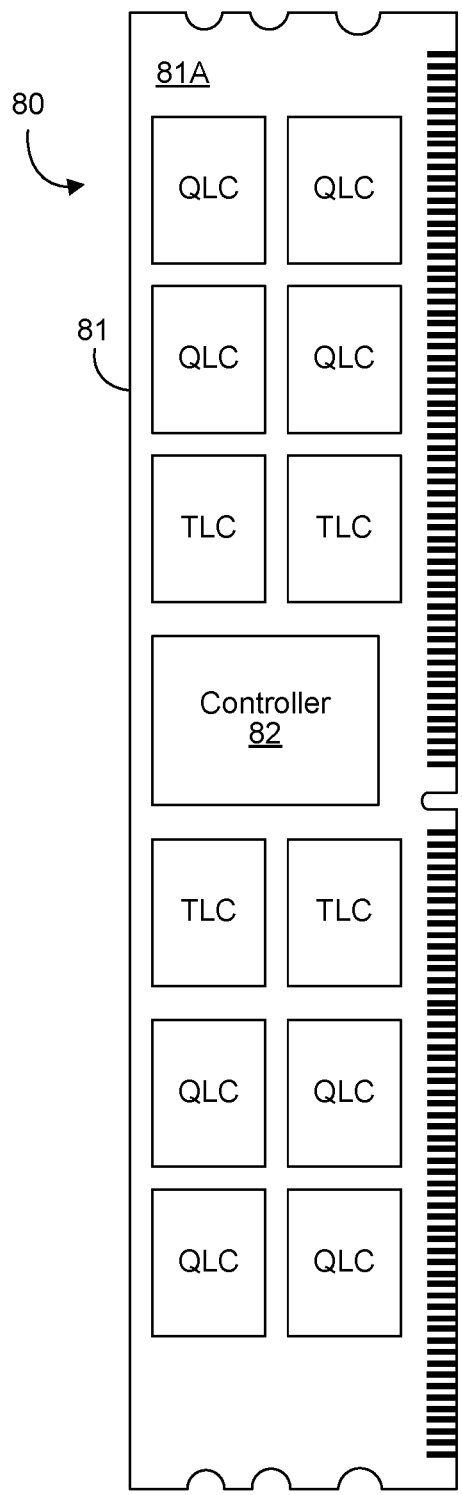
FIGS. 8A and 8B are illustrative top and bottom views of another example of a SSD according to an embodiment.
Figure 8B:
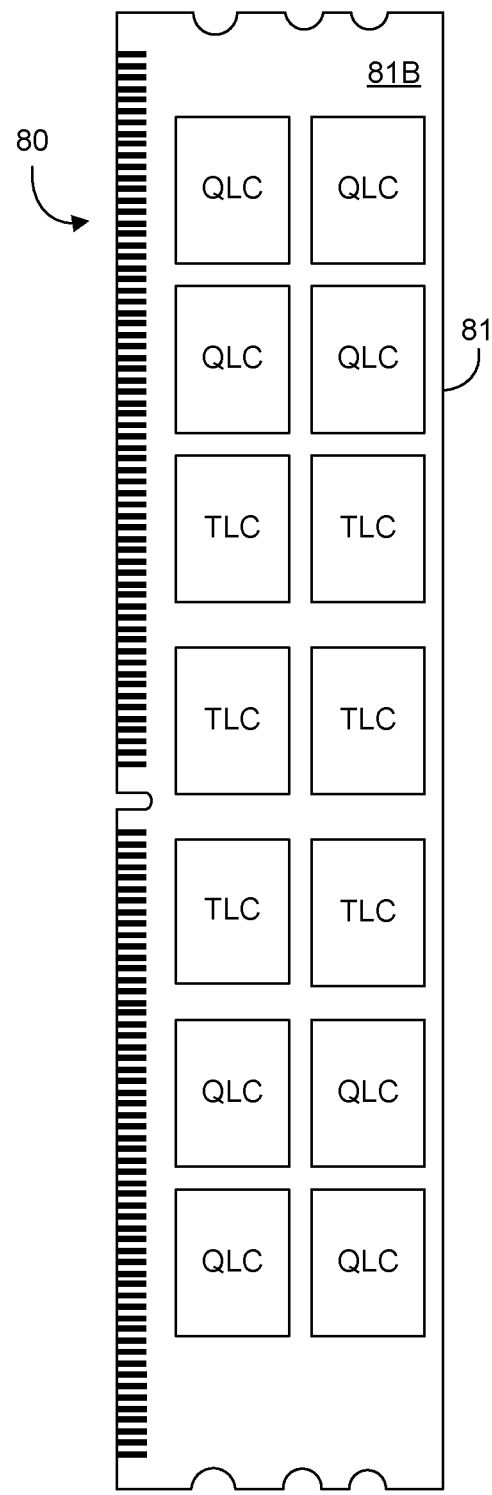

With reference to FIGS. 8A and 8B, an embodiment of a SSD 80 may include a PCB 81 a DIMM form factor, including pins along both sides of a connector edge and components on both sides 81A and 81B of the DIMM. The number of pins shown in FIGS. 8A and 8B is for illustration purposes only, and more or fewer pins may be provided in various embodiments. The particular DIMM form factor shown in FIGS. 8A and 8B is for illustration purposes only, and other DIMM form factors may be provided in various embodiments. The SSD 80 may include additional components, circuitry, and logic to operate as a NVMe standards compliant SSD. For example, the SSD 80 may include, among other things, a controller 82 mounted on the PCB 81, interface component(s) including a communication interface, and a plurality of NAND devices mounted on the PCB 81 organized as two physical clusters. As illustrated, a first performance tier includes a physical cluster of TLC NAND devices that are located physically closer to the controller 82 and a second performance tier includes a physical cluster of QLC NAND devices that are physically further from the controller 82 (e.g., as compared to the TLC NAND devices).

In an example operation of the SSD 80, the controller 82 may get assigned up to 2 storage pools, each corresponding to one performance tier. The controller 82 may be configured to perform data access to the physical cluster of TLC NAND devices at a first bandwidth (e.g., 1600 MT/s), and perform data access to the physical cluster of QLC NAND devices at a second bandwidth (e.g., 1433 MT/s). In some embodiments, the controller 82 may be further configured to present each of the two physical clusters to a host as different drives. For example, the controller 82 may also be configured to direct an access request to a particular one of the two physical clusters based on a drive target of an IO transaction, and/or to arbitrate multiple access requests to the two physical clusters to preserve a higher performance of the TLC physical cluster.

The technology discussed herein may be provided in various computing systems (e.g., including a non-mobile computing device such as a desktop, workstation, server, rack system, etc., a mobile computing device such as a smartphone, tablet, Ultra-Mobile Personal Computer (UMPC), laptop computer, ULTRABOOK computing device, smart watch, smart glasses, smart bracelet, etc., and/or a client/edge device such as an Internet-of-Things (IoT) device (e.g., a sensor, a camera, etc.)).

Additional Notes and Examples

Example 1 includes an electronic apparatus, comprising a substrate, and a controller coupled to the substrate, the controller including circuitry to control access to a NAND-based storage media that includes a plurality of NAND devices located on the substrate and organized into two or more physical clusters with each NAND device uniquely assigned to one of the two or more physical clusters, perform data access to a first physical cluster of the two or more physical clusters at a first bandwidth, and perform data access to a second physical cluster of the two or more physical clusters at a second bandwidth that is slower than the first bandwidth.

Example 2 includes the apparatus of Example 1, wherein the circuitry is further to perform data access to a third physical cluster at a third bandwidth that is slower than the second bandwidth.

Example 3 includes the apparatus of any of Examples 1 to 2, wherein the circuitry is further to control access to a first type of NAND media in the first physical cluster, and control access to a second type of NAND media in the second physical cluster.

Example 4 includes the apparatus of any of Examples 1 to 3, wherein the circuitry is further to present each of the two or more physical clusters to a host as different drives.

Example 5 includes the apparatus of Example 4, wherein the circuitry is further to direct an access request to a particular one of the two or more physical clusters based on a drive target of an input/output transaction.

Example 6 includes the apparatus of Example 5, wherein the circuitry is further to arbitrate multiple access requests to the two or more physical clusters to preserve a higher performance of physical clusters with faster bandwidth.

Example 7 includes the apparatus of any of Examples 1 to 6, wherein the controller and the NAND-based storage media are incorporated in a solid-state drive.

Example 8 includes an electronic storage system, comprising NAND-based storage media that includes a plurality of NAND devices located on a same substrate and organized into two or more physical clusters with each NAND device uniquely assigned to one of the two or more physical clusters, and a controller communicatively coupled to the NAND-based storage media, the controller including circuitry to perform data access to a first physical cluster of the two or more physical clusters at a first bandwidth, and perform data access to a second physical cluster of the two or more physical clusters at a second bandwidth that is slower than the first bandwidth.

Example 9 includes the system of Example 8, wherein the circuitry is further to perform data access to a third physical cluster at a third bandwidth that is slower than the second bandwidth.

Example 10 includes the system of any of Examples 8 to 9, wherein the circuitry is further to control access to a first type of NAND media in the first physical cluster, and control access to a second type of NAND media in the second physical cluster.

Example 11 includes the system of any of Examples 8 to 10, wherein the circuitry is further to present each of the two or more physical clusters to a host as different drives.

Example 12 includes the system of Example 11, wherein the circuitry is further to direct an access request to a particular one of the two or more physical clusters based on a drive target of an input/output transaction.

Example 13 includes the system of Example 12, wherein the circuitry is further to arbitrate multiple access requests to the two or more physical clusters to preserve a higher performance of physical clusters with faster bandwidth.

Example 14 includes the system of any of Examples 8 to 13, wherein the controller and the NAND-based storage media are incorporated in a solid-state drive.

Example 15 includes a method of controlling storage, comprising controlling access to a NAND-based storage media that includes a plurality of NAND devices located on the substrate and organized into two or more physical clusters with each NAND device uniquely assigned to one of the two or more physical clusters, performing data access to a first physical cluster of the two or more physical clusters at a first bandwidth, and performing data access to a second physical cluster of the two or more physical clusters at a second bandwidth that is slower than the first bandwidth.

Example 16 includes the method of Example 15, further comprising performing data access to a third physical cluster at a third bandwidth that is slower than the second bandwidth.

Example 17 includes the method of any of Examples 15 to 16, further comprising controlling access to a first type of NAND media in the first physical cluster, and controlling access to a second type of NAND media in the second physical cluster.

Example 18 includes the method of any of Examples 15 to 17, further comprising presenting each of the two or more physical clusters to a host as different drives.

Example 19 includes the method of Example 18, further comprising directing an access request to a particular one of the two or more physical clusters based on a drive target of an input/output transaction.

Example 20 includes the method of Example 19, further comprising arbitrating multiple access requests to the two or more physical clusters to preserve a higher performance of physical clusters with faster bandwidth.

Example 21 includes the method of any of Examples 15 to 20, wherein the NAND-based storage media is incorporated in a solid-state drive.

Example 22 includes at least one non-transitory machine readable medium comprising a plurality of instructions that, in response to being executed on a computing device, cause the computing device to control access to a NAND-based storage media that includes a plurality of NAND devices located on the substrate and organized into two or more physical clusters with each NAND device uniquely assigned to one of the two or more physical clusters, perform data access to a first physical cluster of the two or more physical clusters at a first bandwidth, and perform data access to a second physical cluster of the two or more physical clusters at a second bandwidth that is slower than the first bandwidth.

Example 23 includes the at least one non-transitory machine readable medium of Example 22, comprising a plurality of further instructions that, in response to being executed on the computing device, cause the computing device to perform data access to a third physical cluster at a third bandwidth that is slower than the second bandwidth.

Example 24 includes the at least one non-transitory machine readable medium of any of Examples 22 to 23, comprising a plurality of further instructions that, in response to being executed on the computing device, cause the computing device to control access to a first type of NAND media in the first physical cluster, and control access to a second type of NAND media in the second physical cluster.

Example 25 includes the at least one non-transitory machine readable medium of any of Examples 22 to 24, comprising a plurality of further instructions that, in response to being executed on the computing device, cause the computing device to present each of the two or more physical clusters to a host as different drives.

Example 26 includes the at least one non-transitory machine readable medium of Example 25, comprising a plurality of further instructions that, in response to being executed on the computing device, cause the computing device to direct an access request to a particular one of the two or more physical clusters based on a drive target of an input/output transaction.

Example 27 includes the at least one non-transitory machine readable medium of Example 26, comprising a plurality of further instructions that, in response to being executed on the computing device, cause the computing device to arbitrate multiple access requests to the two or more physical clusters to preserve a higher performance of physical clusters with faster bandwidth.

Example 28 includes the at least one non-transitory machine readable medium of any of Examples 22 to 27, wherein the NAND-based storage media is incorporated in a solid-state drive.

Example 29 includes a storage controller apparatus, comprising means for controlling access to a NAND-based storage media that includes a plurality of NAND devices located on the substrate and organized into two or more physical clusters with each NAND device uniquely assigned to one of the two or more physical clusters, means for performing data access to a first physical cluster of the two or more physical clusters at a first bandwidth, and means for performing data access to a second physical cluster of the two or more physical clusters at a second bandwidth that is slower than the first bandwidth.

Example 30 includes the apparatus of Example 29, further comprising means for performing data access to a third physical cluster at a third bandwidth that is slower than the second bandwidth.

Example 31 includes the apparatus of any of Examples 29 to 30, further comprising means for controlling access to a first type of NAND media in the first physical cluster, and means for controlling access to a second type of NAND media in the second physical cluster.

Example 32 includes the apparatus of any of Examples 29 to 31, further comprising means for presenting each of the two or more physical clusters to a host as different drives.

Example 33 includes the apparatus of Example 32, further comprising means for directing an access request to a particular one of the two or more physical clusters based on a drive target of an input/output transaction.

Example 34 includes the apparatus of Example 33, further comprising means for arbitrating multiple access requests to the two or more physical clusters to preserve a higher performance of physical clusters with faster bandwidth.

Example 35 includes the apparatus of any of Examples 29 to 34, wherein the NAND-based storage media is incorporated in a solid-state drive.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C. Various components of the systems described herein may be implemented in software, firmware, and/or hardware and/or any combination thereof. For example, various components of the systems or devices discussed herein may be provided, at least in part, by hardware of a computing SoC such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the operations discussed herein and/or any portions the devices, systems, or any module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. An electronic apparatus, comprising:
   a substrate; and
   a controller coupled to the substrate, the controller including circuitry to:
   control access to a NAND-based storage media that includes a plurality of NAND devices located on the substrate and organized into two or more physical clusters with each NAND device uniquely assigned to one of the two or more physical clusters, wherein the two or more physical clusters are arranged around the controller with a fastest physical cluster of the two or more physical clusters being closest to the controller, NAND devices of the fastest physical cluster comprising NAND devices with a lowest number of levels of the plurality of NAND devices;
   perform data access to a first physical cluster of the two or more physical clusters at a first bandwidth;
   perform data access to a second physical cluster of the two or more physical clusters at a second bandwidth that is slower than the first bandwidth;
   present the two or more physical clusters to a host operating system each as a different respective virtual drive; and
   direct an access request to a particular one of the two or more physical clusters based on a drive target of an input/output transaction.

2. The apparatus of claim 1, wherein the circuitry is further to:
   perform data access to a third physical cluster at a third bandwidth that is slower than the second bandwidth.

3. The apparatus of claim 1, wherein the circuitry is further to:
   control access to a first type of NAND media in the first physical cluster; and
   control access to a second type of NAND media in the second physical cluster.

4. The apparatus of claim 1, wherein the circuitry is further to:
   arbitrate multiple access requests to the two or more physical clusters to preserve a higher performance of physical clusters with faster bandwidth.

5. The apparatus of claim 1, wherein the controller and the NAND-based storage media are incorporated in a solid-state drive.

6. An electronic storage system, comprising:
   NAND-based storage media that includes a plurality of NAND devices located on a same substrate and organized into two or more physical clusters with each NAND device uniquely assigned to one of the two or more physical clusters; and
   a controller communicatively coupled to the NAND-based storage media, wherein the two or more physical clusters are arranged around the controller with a fastest physical cluster of the two or more physical clusters being closest to the controller, NAND devices of the fastest physical cluster comprising NAND devices with a lowest number of levels of the plurality of NAND devices, the controller including circuitry to:
   perform data access to a first physical cluster of the two or more physical clusters at a first bandwidth;
   perform data access to a second physical cluster of the two or more physical clusters at a second bandwidth that is slower than the first bandwidth;
   present the two or more physical clusters to a host operating system each as a different respective virtual drive; and
   direct an access request to a particular one of the two or more physical clusters based on a drive target of an input/output transaction.

7. The system of claim 6, wherein the circuitry is further to:
   perform data access to a third physical cluster at a third bandwidth that is slower than the second bandwidth.

8. The system of claim 6, wherein the circuitry is further to:
   control access to a first type of NAND media in the first physical cluster; and control access to a second type of NAND media in the second physical cluster.

9. The system of claim 6, wherein the circuitry is further to:
   arbitrate multiple access requests to the two or more physical clusters to preserve a higher performance of physical clusters with faster bandwidth.

10. The system of claim 6, wherein the controller and the NAND-based storage media are incorporated in a solid-state drive.

11. A method of controlling storage, comprising:
    controlling, using a controller, access to a NAND-based storage media that includes a plurality of NAND devices located on the substrate and organized into two or more physical clusters with each NAND device uniquely assigned to one of the two or more physical clusters, wherein the two or more physical clusters are arranged around the controller with a fastest physical cluster of the two or more physical clusters being closest to the controller, NAND devices of the fastest physical cluster comprising NAND devices with a lowest number of levels of the plurality of NAND devices;
    performing data access to a first physical cluster of the two or more physical clusters at a first bandwidth;

performing data access to a second physical cluster of the two or more physical clusters at a second bandwidth that is slower than the first bandwidth;

presenting the two or more physical clusters to a host operating system each as a different respective virtual drive; and directing an access request to a particular one of the two or more physical clusters based on a drive target of an input/output transaction.

12. The method of claim 11, further comprising:
performing data access to a third physical cluster at a third bandwidth that is slower than the second bandwidth.

13. The method of claim 11, further comprising:
controlling access to a first type of NAND media in the first physical cluster; and
controlling access to a second type of NAND media in the second physical cluster.

14. The method of claim 11, further comprising:
arbitrating multiple access requests to the two or more physical clusters to preserve a higher performance of physical clusters with faster bandwidth.

* * * * *